No. 736,430. PATENTED AUG. 18, 1903.
E. A. NUGENT.
BOTTLE STOPPER.
APPLICATION FILED NOV. 1, 1902.
NO MODEL.
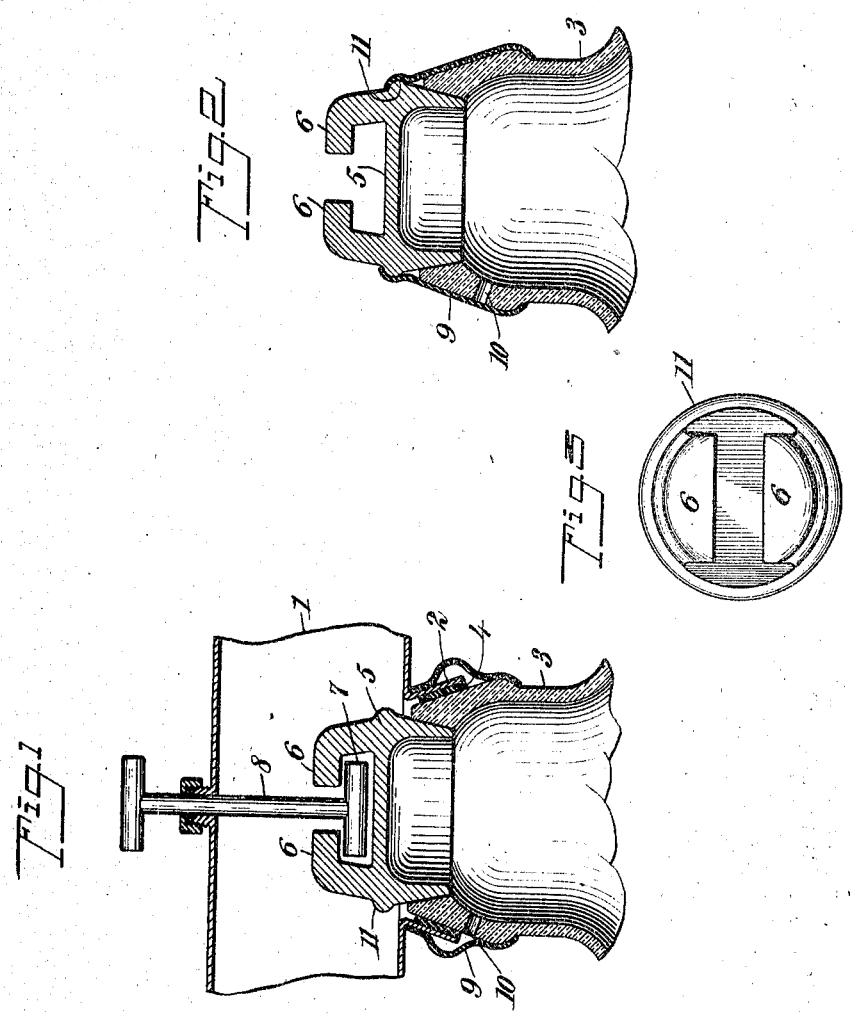
WITNESSES:
INVENTOR
Edgar A. Nugent
BY
ATTORNEYS.

UNITED STATES PATENT OFFICE.

EDGAR A. NUGENT, OF UNIONVILLE, NEW YORK.

BOTTLE-STOPPER.

SPECIFICATION forming part of Letters Patent No. 736,430, dated August 18, 1903.

Application filed November 1, 1902. Serial No. 129,655. (No model.)

*To all whom it may concern:*

Be it known that I, EDGAR A. NUGENT, a citizen of the United States, and a resident of Unionville, in the county of Orange and State of New York, have invented new and useful Improvements in Bottle-Stoppers, of which the following is a full, clear, and exact description.

This invention relates particularly to stoppers for milk-bottles that are designed to be filled with milk through the operation of a milking-machine—such, for instance, as shown in my application for patent filed December 31, 1901, Serial No. 87,891—the object being to provide a simple and effectual means for sealing the bottles from which the air is exhausted before removing the same from the machine, thus preventing the entrance of air or impurities from the air in the stable and preserving the milk for a greater length of time than is possible when the air is contained in the bottles with the milk.

I will describe a bottle-stopper embodying my invention and then point out the novel features in the appended claims.

Reference is to be had to the accompanying drawings, forming a part of this specification, in which similar characters of reference indicate corresponding parts in all the figures.

Figure 1 is a sectional view showing a bottle in connection with an exhaust-pan of a milker and showing the stopper in place. Fig. 2 is a section showing the bottle and stopper removed from the pan, and Fig. 3 is a top view of the stopper.

Referring to the drawings, 1 designates a portion of an exhaust-pan used in connection with the milking-machine, and this exhaust-pan is provided at its bottom wall with a series of openings to receive the necks of bottles. Each opening has surrounding it a downwardly-extended and outwardly-flared flange 2 for receiving the upper portion of the bottle-neck 3. To prevent the entrance of air, a rubber packing-ring 4 is placed between the flange and the bottle-neck. The mouth of the bottle has its wall flared, and the entering portion of the stopper 5 is correspondingly flared. This stopper may consist of any suitable material—such, for instance, as hard rubber, or it may be made of glass. On the upper portion of the stopper are inwardly-turned hooks 6, under which the cross-head 7 of a stopper-inserting rod 8 is designed to engage. This rod 8 is movable through an opening in the top wall of the pan 1. Engaging around the neck of the bottle is a yielding rubber band 9, which is designed primarily to close a vent-hole 10 in the neck of the bottle. When the bottle is in position or in connection with the exhaust-pan, the rubber band will not only cover the vent, but will engage closely around the outer side of the flange 2, thus serving as a means auxiliary to the ring 4 for preventing any possible entrance of air while the bottle is being filled.

In the operation the stopper 5 will be raised out of the mouth of the bottle, and thus the milk from the cow will pass into the pan 1 and thence into the bottle. Of course it will be understood that the bottle is exhausted of air. After refilling the stopper is to be moved downward by means of the rod 8, and then by giving the rod a one-quarter rotation the cross-head 7 may be drawn out through the space between the hooks, after which the bottle may be removed, and in this removing of the bottle the upper portion of the ring 9 will be drawn upward and engaged over an annular bead 11 on the stopper, as indicated in Fig. 2. This of course closes the vent 10. When it is desired to open the bottle, it is obvious that air must be admitted before the stopper can be drawn out. To admit the air, it is only necessary to raise a portion of the lower part of the ring 9 above the vent 10.

The inner portion of the stopper is made cup-shaped, so that should the bottle or can be full of milk the stopper may be inserted.

While I have described the stopper in connection with a milk bottle or can, it is obvious that it may be used for fruit-jars or the like.

Having thus described my invention, I claim as new and desire to secure by Letters Patent—

1. A bottle having a vent in its neck portion, a stopper for the bottle, hook members on the top of the stopper and a flexible ring for engaging with the neck of the bottle and with the stopper, and for covering said vent, substantially as specified.

2. A bottle and a stopper for the bottle having inwardly-turned hook members on its upper side, substantially as specified.

3. The combination with a bottle having a vent in the upper portion of its neck, of a stopper having an annular bead, inwardly-turned hook members on the upper side of the stopper, a rubber ring or band for engaging around the neck of the bottle to cover the vent and also adapted to engage with said bead, substantially as specified.

In testimony whereof I have signed my name to this specification in the presence of two subscribing witnesses.

EDGAR A. NUGENT.

Witnesses:
ALBERT ROGERS,
FRED. J. ROGERS.